Aug. 3, 1965   J. J. MATHEWS   3,198,293
BRAKE MEANS
Filed April 25, 1963

INVENTOR.
JOHN J. MATHEWS
BY
OSTROLENK, FABER, GERB & SOFFEN
ATTORNEYS

United States Patent Office 3,198,293
Patented Aug. 3, 1965

3,198,293
BRAKE MEANS
John J. Mathews, Levittown, Pa., assignor to Koilsman Instrument Corporation, Elmhurst, N.Y., a corporation of New York
Filed Apr. 25, 1963, Ser. No. 275,730
6 Claims. (Cl. 188—163)

The instant invention relates to braking devices in general and more particularly to an electromechanical braking device, useful with small size rotating units.

For servo motors and other small motor applications it is highly desirable to have a compact electrically operated mechanical braking device. Typically, the prior art has provided devices in which the energization of a magnet moves a brake member transverse to the motor axis into direct mechanical engagement with another brake member. One of these brake members is keyed to the motor shaft while the other member is mounted to a relatively fixed point so that upon engagement of the two members shaft rotation will cease.

The basic concept of the instant invention is to provide a construction in which operation of a magnet armature along the motor axis is effective to move a plurality of brake shoes transverse to this axis into engagement with a brake drum. Mechanical energy is transmitted from the armature to the brake shoes by a plurality of balls which are driven by a conical surface of the armature against the brake shoe thereby forcing the shoes against the brake drum.

The use of the balls as a means for transmitting mechanical energy from the armature to the brake shoes results in low friction losses in energy transmission. It has been found that this arrangement permits considerably more force to be applied for a much smaller longitudinal displacement of the armature than in constructions utilizing the conventional in-line method of applying the force longitudinally to a pair of clutch plates. Further it has been found that by utilizing the balls as a low friction force transmission means much less critical manufacturing tolerances are permitted.

Accordingly, a primary object of the instant invention is to provide a novel construction for a brake means.

Another object is to provide a novel compact construction for a brake means which permits considerably more force to be applied for a much smaller displacement than is possible in conventional brake arrangements.

Still another object is to provide a brake means in which a plurality of balls are utilized as a low friction force transmitting means between a wedge member and a plurality of brake shoes.

A still further object is to provide a novel construction for a brake means in which manufacturing tolerances are much less critical than in prior art devices of this class.

These as well as further objects of this invention shall become readily apparent after reading the following description of the accompanying drawings in which.

Figure 1:
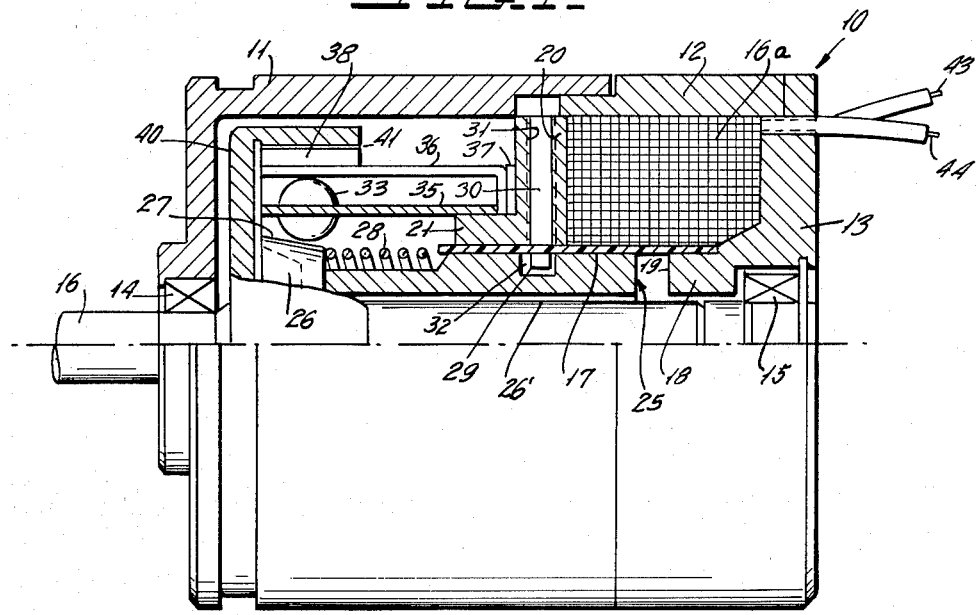
FIGURE 1 is an exploded perspective of the main elements of a brake means constructed in accordance with the teachings of the instant invention.

Brake unit 10 includes a housing formed by cup shaped member 11 the lip of which extends rearwardly over the forward edge of cylindrical housing portion 12. The rear of cylinder 12 is closed by disk-like housing end cap 13. Housing portions 11 and 13 carry bearings 14, 15, respectively, which constitute supports for rotatable shaft 16. As should be understood by those skilled in the art, shaft 16 is adapted to be mechanically coupled to the device, such as a servo motor, which is to operate in conjunction with brake unit 10.

The other elements to be hereinafter described are all disposed within housing 11, 12, 13. Portions 12 and 13 are constructed of material having low magnetic reluctance, with these housing portions constituting a major portion of the path for flux generated by current flowing through actuating coil 16a. Coil 16a is wound about cylindrical coil form 17 which is concentric with shaft 16 and extends forward from the central forward projecting portion 18 of housing part 13. The outer portion of coil 16a is surrounded by housing portion 12 while the rear of coil 16 is bounded by housing portion 13 and the front of coil 16a is bounded by disk 20. The latter is provided with forward extensions 21 having a central aperture through which coil form 17 extends.

Armature 25 is provided with a central aperture 26' through which shaft 16 extends. The rear end of armature 25 is cylindrical and extends into coil form 17 with the rear end of armature 25 being spaced from pole face 19 to form an air gap in the magnetic circuit consisting of housing portions 13 and 12, disk 20, and armature 25. The forward end of armature 25 is provided with disk 26 whose peripheral edge 27 is inclined with respect to the longitudinal axis of shaft 16. Thus, edge 27 is a conical surface. Coil spring 28, surrounding an intermediate portion of armature 25, bears against disk 26 and the forward edge of coil form 17 thereby urging armature 25 to the left with respect to FIGURE 2 away from pole face 19.

Screw member 30 disposed within threaded aperture 31 extending radially through disk 20 is provided with stop 29. Stop 29 extends through an aperture in coil form 17 into recess 32 of armature 25. Recess 32 and stop 29 cooperate to limit movement of armature 25 toward and away from pole face 19.

Resting against conical surface 27 are a plurality of balls 33. Each ball 33 extends through an individual aperture 34 of retainer band 35. Band 35 is mounted to disk extension 21 extending forwardly thereof. Each of the balls 33 is positioned to engage an individual spring finger 36 on the inner surface thereof. The rear end of each finger is riveted to ring 37 and the forward end of each finger on the outer surface thereof is provided with a pad 38 of brake lining material. The portions of spring fingers 36 extending forwardly from disk 37 are disposed substantially parallel to shaft 16 with brake linings 38 positioned opposite the inner cylindrical surface of brake drum 40. Brake drum 40 is keyed to shaft 16 with the cylindrical portion of drum 40 being concentric with shaft 16.

It is noted that only shaft 16 and brake drum 40 are mounted for rotation with respect to housing 11, 12, 13. All of the remaining elements are interconnected in a manner well-known to the art so that these elements are fixed against rotation with respect to housing 11, 12, 13.

Brake unit 10 is operated as follows. When the elements are in the position of FIGURE 1 actuating coil 16 is deenergized and there are gaps 41 between the linings 38 on brake shoe fingers 36 and the cylindrical portion of brake drum 40. Thus, there is nothing to restrain rotation of shaft 16.

When actuating coil 16 is energized, by providing a suitable voltage at leads 43, 44, flux is generated in the magnetic circuit 25, 20, 12 and 13 and across the air gap between pole face 19 and armature 25. This flux causes armature 25 to move to the right with respect to FIGURE 1 with this movement being limited by the engagement of the left boundary of recess 32 with stop 29, if this movement has not sooner been stopped through engagement of brake linings 38 with drum 40. During this movement of armature 25 to the right with respect to FIGURE 1 conical surface 27 acts as a wedge forcing balls 33 radially outward into engagement with brake shoes 36. This urges brake linings 38 into firm engagement with the cylindrical portion of brake drum 40 thereby locking drum 40 and shaft 16 to housing 11, 12, 13 of brake unit 10 to halt rotation of shaft 16.

Thus, it is seen that the utilization of balls 33 provides a low friction means for transmitting the force established through the energization of actuating coil 16 to urge brake linings 38 firmly into engagement with brake drum 40. This construction permits considerably more force to be transmitted for a much smaller longitudinal displacement of armature 25 than is possible with constructions of the prior art. Further the provision of a plurality of individually deflectable brake shoes 36 permits braking forces to be evenly distributed.

Figure 2:
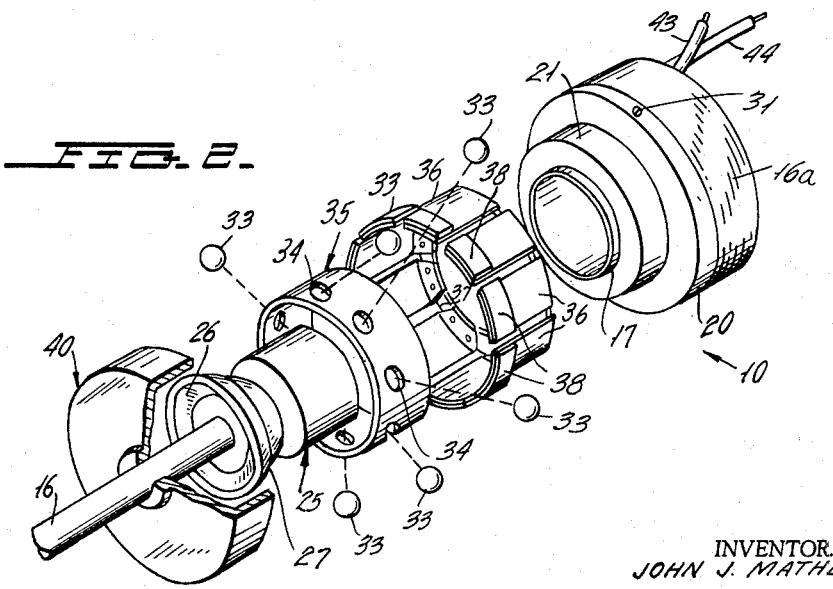
FIGURE 2 is a side elevation of the elements of FIGURE 1 in assembled form with portions broken away to reveal construction details.

It will be recognized that the principles hereinbefore described and embodied in the structure of FIGURES 1 and 2 are equally applicable to a spring operated brake which is released by an electromagnet. Such a structure may be readily constructed by reversing the slope of conical surface so that in the position occupied by armature 25 in FIGURE 1 brake linings 38 are urged outwardly into braking engagement with drum 40 to restrain rotation of shaft 16. With such a construction, energization of magnet coil 16 moves armature 25 to the right with respect to FIGURE 1 permitting shoes 36 to move radially inward thereby removing linings 38 from drum 40 so that shaft 16 is free to rotate.

Although there has been described a preferred embodiment of this novel invention, many variations and modifications will now be apparent to those skilled in the art. Therefore, this invention is to be limited, not by the specific disclosure herein, but only by the appending claims. The embodiments of the invention in which an exclusive privilege or property is claimed are defined as follows:

1. A device of the class described including a rotatable shaft, an armature mounted for axial movement along said shaft between a first and a second position, said armature having a conical surface concentric with respect to the longitudinal axis of said shaft, brake elements a first one of which is keyed to said shaft, said brake elements being in non-braking position when said armature is in said first position, said brake elements being in frictional braking engagement when said armature is in said second position, and engageable by said conical surface to operate said brake elements into frictional braking engagement as said armature is moved from said first to said second position, said first brake element comprising a drum concentric with respect to said shaft and in which a second one of said brake elements comprises means including a plurality of strips carrying friction material interposed between the conical surface and the drum, said strips extending generally parallel to said longitudinal axis being arranged in a circular array about said shaft as a center and being deflectable transverse to said shaft, said friction material being driven against engagement with said drum upon operation of said armature to said second position, said balls engaging said strips upon operation of said armature to said second position.

2. The device of claim 1 in which there is a means biasing said armature to one of said first and said second positions and an electromagnetic means for operating said armature to the other of said first and said second positions.

3. The device of claim 1 in which there is a retainer for said balls, said retainer including a band portion, concentric with said shaft, said band portion having a plurality of apertures through which said balls extend, said apertures being of smaller diameter than said balls.

4. The device of claim 2 in which the conical surface is closer to said shaft than said drum.

5. The device of claim 4 in which there is a relatively fixed point of reference to which a first end of each of said strips is fixedly connected, said friction material being at the other end of each of said strips.

6. A device of the class described including a rotatable shaft, an armature mounted to said shaft and having a conical surface concentric with the longitudinal axis of said shaft, a spring biasing said armature to a first position, an electromagnet for moving said armature along said axis to a second position, a brake drum keyed to said shaft, a plurality of brake shoe carrying fingers arranged in a circular array about said axis as a center and extending generally parallel thereto, said fingers interposed between said conical surface and said brake drum, ball means interposed between and indirect contact with said fingers and said conical surface in direct contact with each, said armature upon movement to said second position having its said conical surface drive said balls against said fingers thereby transmitting force components which drive said brake shoes against said brake drum to halt rotation of said shaft.

References Cited by the Examiner
UNITED STATES PATENTS

| 1,088,248 | 2/14 | Via | 188—70 |
|---|---|---|---|
| 1,270,533 | 6/18 | Lombard. | |
| 2,213,340 | 9/40 | Ellars. | |
| 2,599,247 | 6/52 | Forbes. | |
| 2,802,121 | 8/57 | Sorchy | 188—161 X |
| 2,969,855 | 1/61 | Demorest. | |

ARTHUR L. LA POINT, *Primary Examiner.*

DUANE A. REGER, *Examiner.*